United States Patent
Hansen

[15] 3,698,730
[45] Oct. 17, 1972

[54] TANK WAGON

[72] Inventor: Clarence M. Hansen, East Lansing, Mich.

[73] Assignee: Board of Trustees of Michigan State University, East Lansing, Mich.

[22] Filed: Sept. 10, 1970

[21] Appl. No.: 70,950

[52] U.S. Cl..............280/5 E, 280/411 B, 280/415 R, 280/106 R
[51] Int. Cl. ..............................................B60p 3/22
[58] Field of Search.........280/415, 412, 29, 30, 79.1, 280/79.2, 79.3, 5, 5 E, 106, 34

[56] References Cited

UNITED STATES PATENTS

| | | | |
|---|---|---|---|
| 2,801,864 | 8/1957 | Raney et al. | 280/106 T |
| 3,578,348 | 5/1971 | Reinke | 280/5 E |
| 3,614,124 | 10/1971 | Schwabenlender | 280/106 R |
| 1,958,494 | 5/1934 | Pehrsson | 280/79.1 |
| 2,154,525 | 4/1939 | Noros et al. | 280/79.2 X |
| 2,658,770 | 11/1953 | Koenig | 280/412 |
| 2,736,567 | 2/1956 | McMurray | 280/34 A |
| 2,851,235 | 9/1958 | Henig | 280/79.1 UX |
| 2,996,310 | 8/1961 | Culver | 280/106 R |

*Primary Examiner*—Kenneth H. Betts
*Attorney*—Miller, Morriss, Pappas & McLeod and William J. Morriss

[57] ABSTRACT

An improved tank wagon for hauling liquid and gaseous soil injectants, fumigants and fertilizers and having a selectively resilient chassis-frame torsionally absorbing shock stresses without impairing the tank support and including caster type wheels journalled in the chassis so that the wagon can be offset from a gang plow or implement, for example, and can be towed in a canted attitude parallel to the line of tractor travel. The chassis is provided with adjustable side extending arms for adjusting the chassis to a moving attitude. Journalling means are provided in the chassis for the support casters and brakes are selectively lockable on each caster so that when the tank wagon is towed along a road, for example, the casters are deactivated or suppressed in their pivoting action to allow the towing of the wagon by a fast moving vehicle from its tow bar. The tank is supported fixedly at only one point so that the tank does not overly rigidify the chassis frame.

5 Claims, 18 Drawing Figures

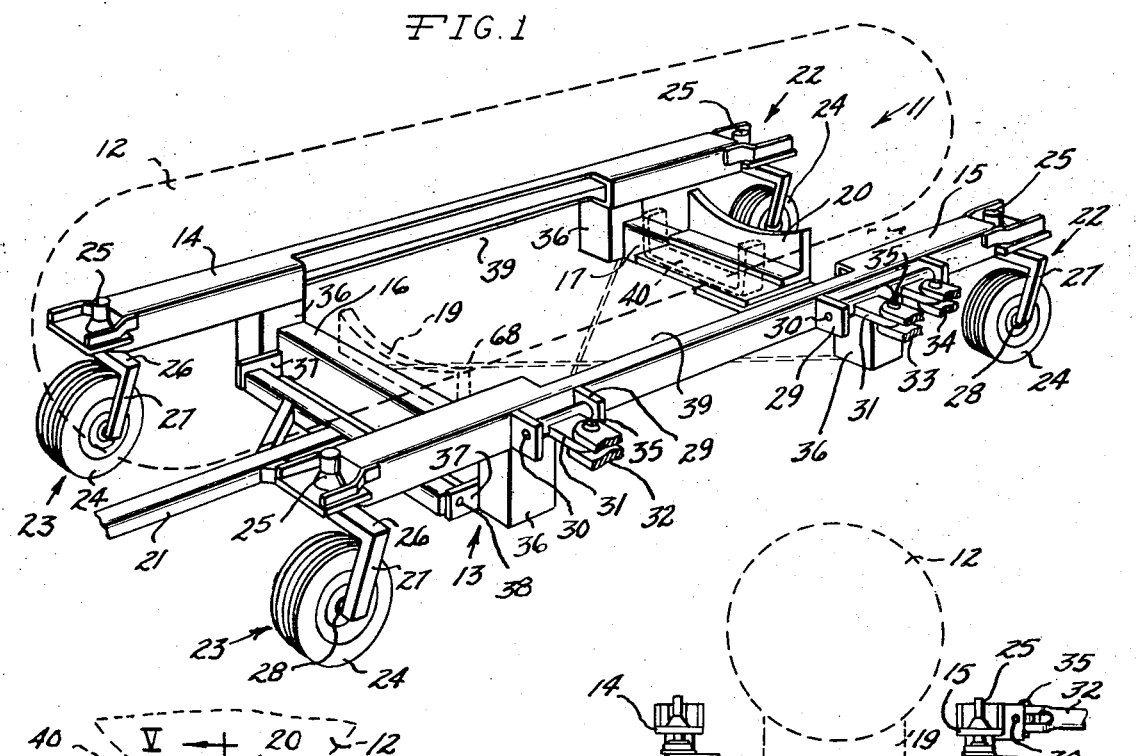

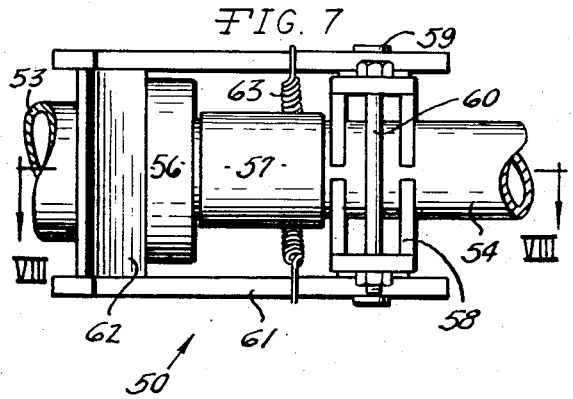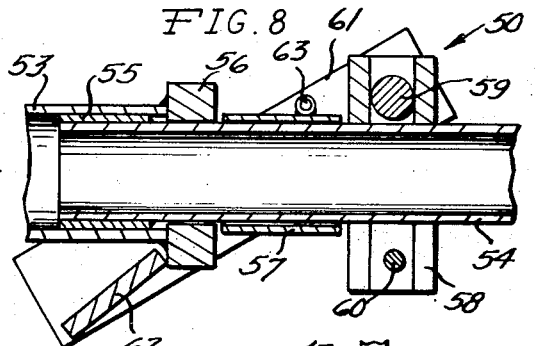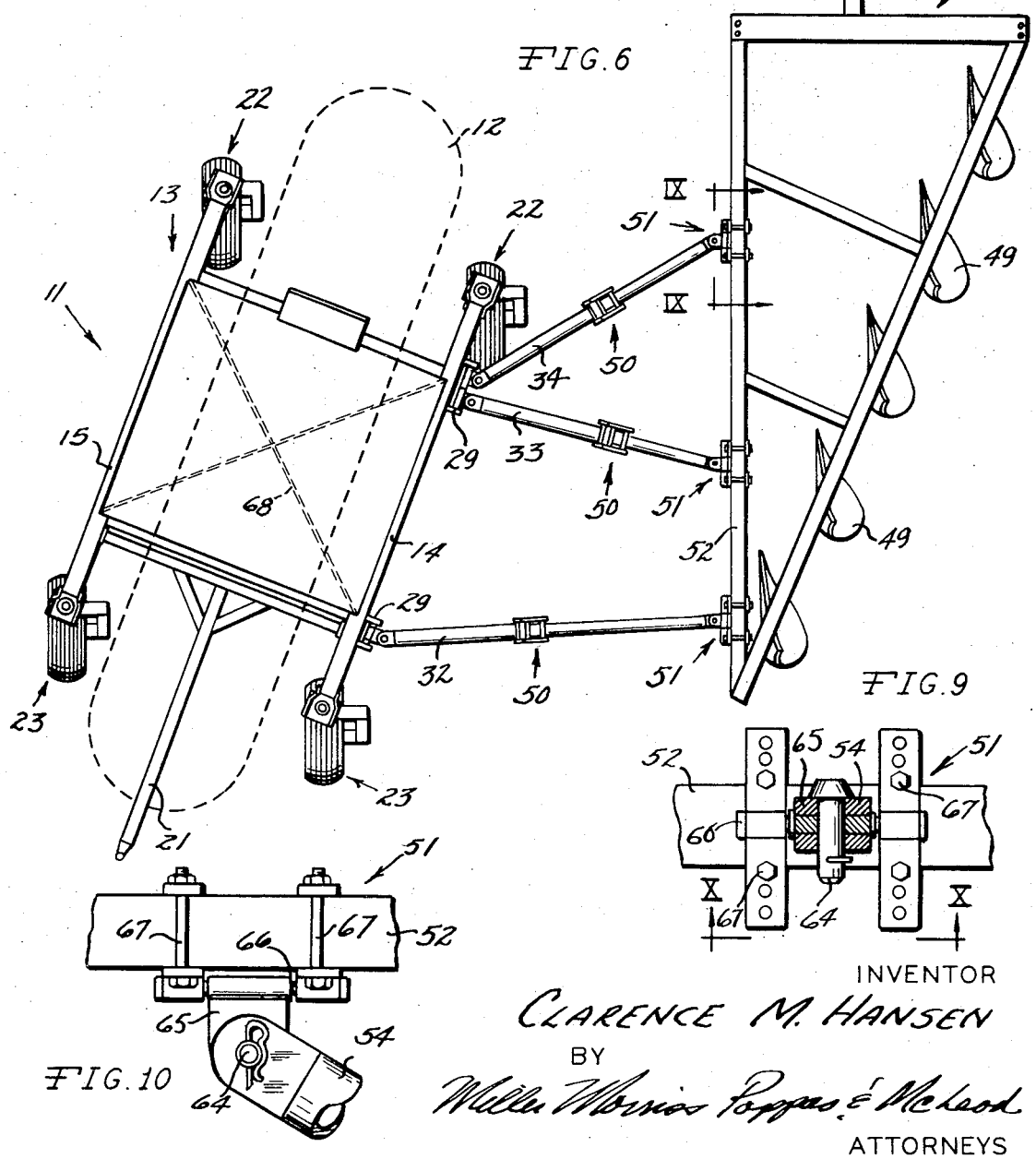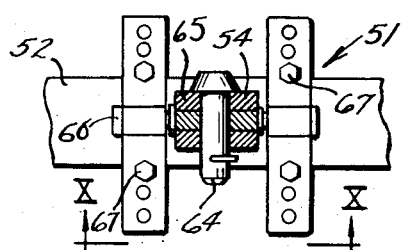

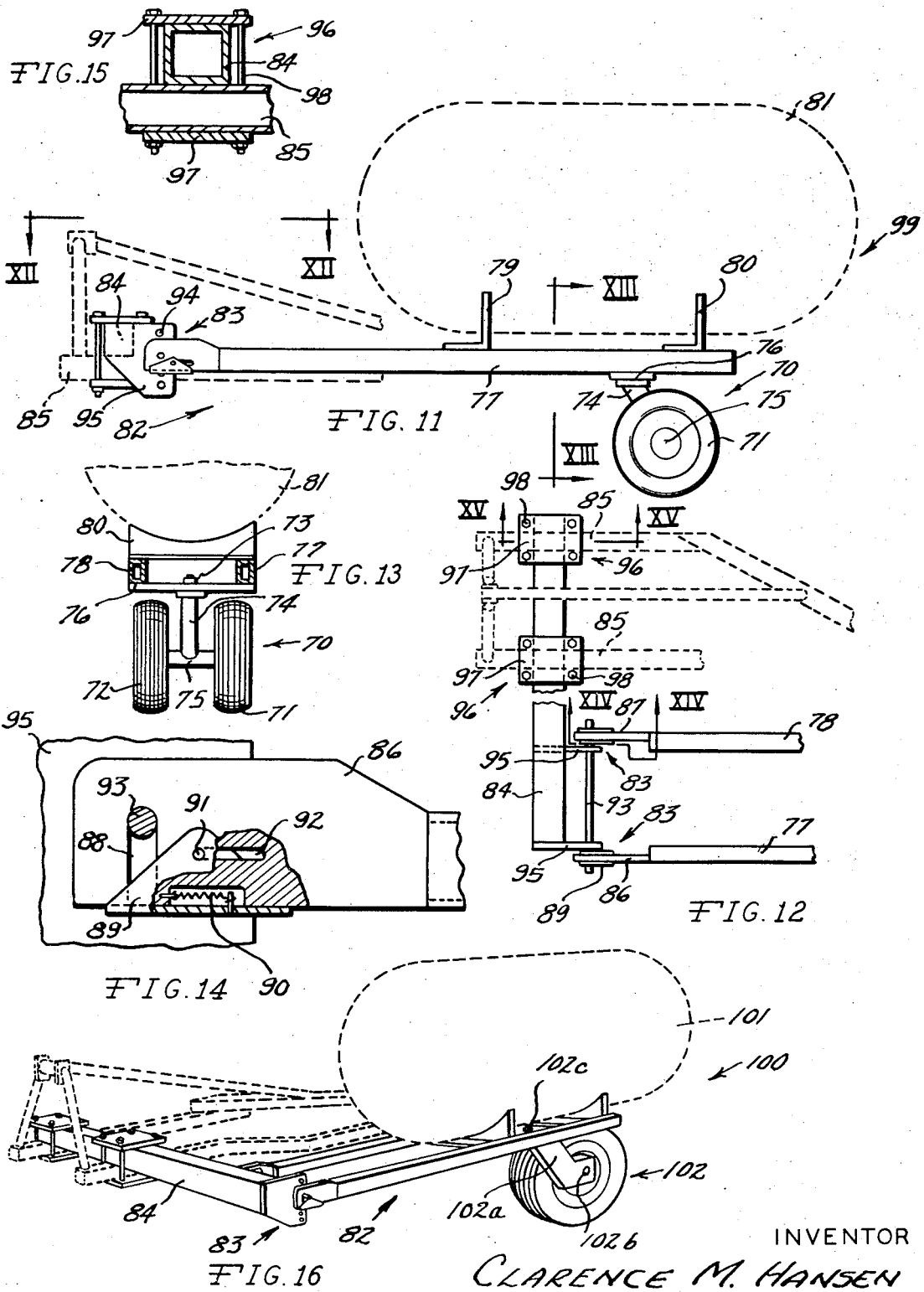

INVENTOR
CLARENCE M. HANSEN

TANK WAGON

The present invention is related to a new and improved tank wagon particularly useful in haulage and transport of soil injectants, fumigants and fertilizers to and from fields where it is ultimately used with tillage equipment. More particularly, the invention relates to the type of wagon where the tank can be changed or refilled and when the tank is on the tank chassis the chassis moves parallel to the prime mover but offset therefrom at an angle so that the cantilever pull of the wagon counteracts the opposed eccentric movement of a soil opening and closing implement, for example, which is served by the material contained in the tank. The chassis is unique in that it flexes, as will be seen, to provide its own torsion support. When moving at such an attitude the wheels must be of the caster type swivelling in vertical journals so that the wheels in motion tend to move in planes parallel to the motion of the prime mover while in fact being offset therefrom in a relation established by the adjustable side arms. When the device requires rapid transport as by movement on roads it is desired to stabilize the device so that it tracks properly behind tractors or trucks at relatively high speed. This is desireable and minimizes down-time in soil treatment where refilling is necessary.

Caster wheeled farm implements are relatively common in the prior art but caster wheeled tank wagons having a frame or chassis adapted to torsionally stress and flex while in support of a tank full of material to be dispensed is not known to the applicant. Further, the applicant knows of no telescopically extending side towing support frame for such devices and knows of no caster wheel swivel locking devices converting the wagon from rough terrain usage to road usage. The closest known art is: U.S. Pat. No. 2,796,266 to J. R. Sells for a wagon chassis; U.S. Pat. No. 2,229,653 to C. Hohl for a trailer; and U.S. Pat. No. 2,658,770 to J. C. Koenig for an implement hitch. In each instance the devices show caster wheels in support of a wagon-like structure. None of the devices illustrate the chassis frame seen here for torsional avoidance of shock damage to storage tanks and for a structure counterpoising working stress against the pull of other farm implements.

Accordingly, the principal object of the present invention is to provide a tank wagon which deformably absorbs shock in its frame while supporting a storage tank.

Another object is to provide an improved tank wagon in which the casters are adjustably lockable and where the riding attitude in field use is adjustable by telescoping side mounting bars. A collateral object is to provide a tank wagon which is selectively towed by an axially extending tow bar for fast road use as to and from storage depots and at which time the caster locks suppress any tendency in the chassis toward side-sway.

Other objects including extreme flexibility of usage, rugged construction, and stable field and road performance at minimum frame weight will be appreciated as the description proceeds.

IN THE DRAWINGS

FIG. 1 is a perspective view of a four wheel tank wagon in accord with the present invention with the tank shown in phantom line to clearly reveal the torsion accomplishing portion of the frame and showing the draw bar partially cut away and the side mounting adjustable arms are also only partially shown.

FIG. 2 is a front elevation view of the structure seen in FIG. 1.

FIG. 3 is a side elevation view taken from the side mounting arm side of the structure seen in FIG. 1.

FIG. 4 is a partial section elevation view taken on the line IV—IV of FIG. 3 and indicating the simple fixed support for the tank.

FIG. 5 is a partial section elevation view taken on the line V—V of FIG. 4 and indicating the adjustability of the tank support element.

FIG. 6 is a top plan view of the structure shown in FIG. 1 attached in canted manner to the plow frame as shown and paralleling the movement direction of the plows.

FIG. 7 is an enlarged detail of the telescoping adjusting joint for the side mounting arms.

FIG. 8 is a sectional elevation view taken on the line VIII—VIII of FIG. 7 and indicating the relationship of the tubular elements permitting telescopic adjustment.

FIG. 9 is a cross section elevation view taken on the line IX—IX of FIG. 6 and showing the pivot pin connection on the vertical end connection.

FIG. 10 is a bottom plan view of the structure seen in FIG. 9 taken on the line X—X thereof.

FIG. 11 is a side elevation view of a two wheel tank wagon in accord with the present invention.

FIG. 12 is a top plan partial view of the frame and side mounting means for the tank wagon of FIG. 11.

FIG. 13 is a section elevation view taken on the line XIII—XIII of FIG. 11.

FIG. 14 is a side elevation view showing the mounting details and taken on line XIV—XIV of FIG. 12.

FIG. 15 is a sectional side elevation view taken on the line XV—XV of FIG. 12 and indicating the clamp of the draw bar to the frame element.

FIG. 16 is a perspective view of a one wheel tank wagon vehicle in which the chassis frame is substantially in accord with the frame in FIGS. 11-15, inclusive.

GENERAL DESCRIPTION

Figure 18:
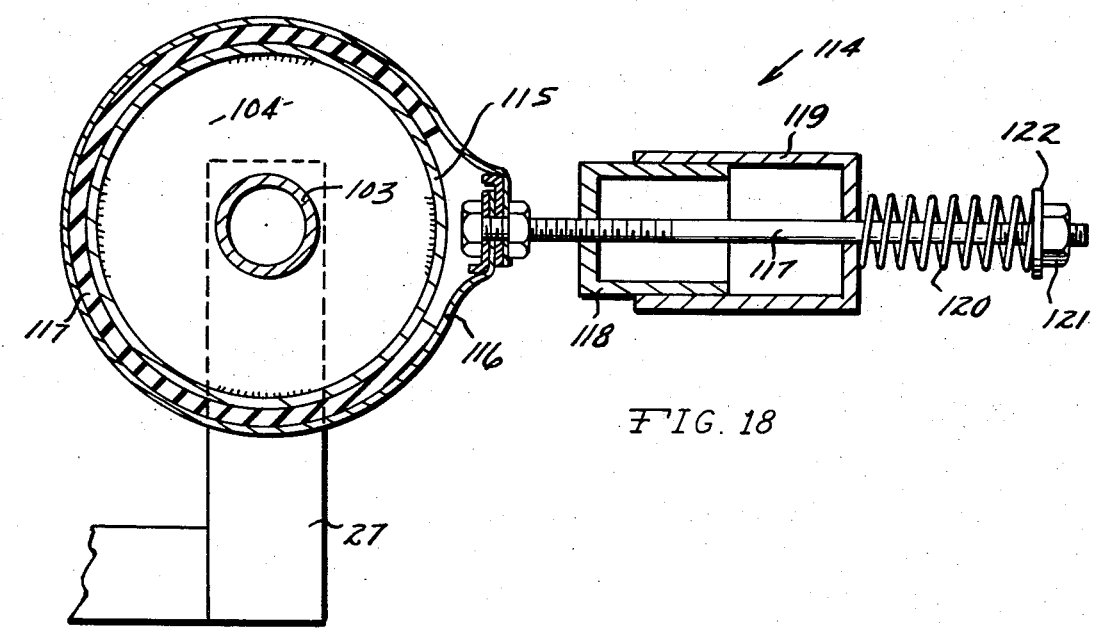
FIG. 18 is a sectional plan view taken on the line XVIII—XVIII of FIG. 3 and showing a swivel brake acting on the vertical pivot and dampening rotation of the wheel on the caster pivot.

In general the invention is a wagon and more particularly a caster wheeled wagon for carrying tanks of the rigid pressurized type. The tank contains liquid or gaseous soil injectants such as fumigants, fertilizers or conditioners. The tank is operably connected to tillage elements. The tillage elements, while opening the earth, inject the liquid or gaseous materials into the earth. The chassis of the wagon is prepared to provide a zone of selected resiliency which allows the chassis to form its own torsion absorption when the wagon is towed over rough terrain. In this device, as will be seen, the tank becomes a portion of the structure of the chassis while the chassis is generally flexing or moving while holding and supporting the tank. The caster wheels permit the tank wagon to accompany tillage elements as pulled behind a tractor. The casters allow the wagon to parallel the travel direction of the tillage element while being secured thereto and in canted adjacent relation. When the tank is empty, the wagon can be disconnected from the tillage equipment and then the wagon can be towed by its regular tow bar at relatively high speed and on roads to obtain a refill of material or a change of tank from empty to full and then the wagon is towed back to the field for connection to the tillage mechanism. For fast transit on roads and the like, the caster wheels are locked or braked to prevent side movement of the wagon and as locked the wagon moves smoothly in an axial direction. The lock or latch prevents rotation on the vertical axis or pivotal axis of each caster. The braking suppresses movement on the vertical axis. The arms which extend from the side of the wagon are adjustably extendable telescopically and are then locked in position. Removable pins anchor the hub of the wagon arms to the tillage device. This permits variant angles as between the tillage device and the wagon. The tank size is dependent upon size of the wagon, but the tank is secured at one point and is cradled at another point along its length. The use of casters allows, for example, a four wheeled wagon to carry about 1,000 gallon tanks. Smaller tanks can be used on smaller wagons of two and even one wheels. The wheels are preferably equipped with pneumatic tires since maximum "float" is obtainable using pneumatic systems. The wheels rotate on a horizontal axis, on anti-friction bearings and a clevis or caster frame supports the horizontal stub shaft and seats at its upper end in a vertical bearing and in a shouldered thrust relation thereagainst. Thus the caster wheel supports the chassis and is free to rotate or pivot 360° on the vertical axis while the wheel is rolling on the horizontal axis. However, the pivoting or swivelling on the vertical axis is selectively suppressed by brake or lock means acting to prevent rotation.

Operationally, the tank wagon of the present invention absorbs its field shocks torsionally and restorably deformably tracks at an off-set relation to tractor and tillage implement direction and may be adjustably canted or coupled to the implement served by the tank by telescoping side hitch bars. It is easily disconnected and the caster wheels are restrained for high speed and road service. The chassis is light in construction but wholly adequate to carry the tanks and soil injectant material. Coupling means as between the tank and tillage equipment provide means for getting the soil injectants from the tank and into the soil. These can be quickly disconnected as when the tank and wagon must be removed from the tillage implements for refilling.

SPECIFIC DESCRIPTION

By reference to the drawings and particularly to FIG. 1, thereof, a tank wagon 11 in accord with the present invention is shown. The tank 12, shown in phantom line, is secured to the chassis 13. The chassis 13 includes two parallel spaced apart juxtaposed rails 14 and 15. The rails 14 and 15 are secured as by welding in spaced apart relation by the transverse spacers 16 and 17. The spacers 16 and 17 include saddle pieces 19 and 20, respectively, against which the elongate tank 12 nests. A pivotal tow bar 21 is pivotally attached to the spacer 16 and extends generally axially of the tank 12 when in use. The tow bar 21 is used primarily for movement of the tank wagon 11 on roads and the like at relatively high speeds. The tank 12 and chassis 13 are supported on a plurality of caster wheels 22 and 23. The wheels all are provided with treads or tires 24, preferably of the pneumatic type, as shown. A vertical journal case 25 is provided for each wheel 22 and 23 and the journal case is welded or otherwise affixed to the chassis 13 at the ends of the rails 14 and 15. Each caster wheel frame 26 includes a vertical swivel pin insertable in the journal cases 25, an integral clevis portion 27, and a horizontal stub axle 28 integrally extending therefrom. Anti-friction bearing means (not shown) are provided as part of the journalling provisions. As will be seen, brake 18 and lock devices 18a are provided (FIG. 3) to suppress the free pivotal or swivel action on the vertical axes, as for example, where the wagon 11 is intended to be moved on roads or highways or at a relatively fast pace or in the field where a slight following resistance to swivelling is desireable.

Extending from the side rail 15 are connector brackets 29. Horizontal pins 30 through the brackets 29 support sleeved tabs 31. The tabs 31 provide means for terminal mounting of the telescoping mounting arm elements 32, 33 and 34, respectively, and secured thereto by vertical pins 35. As appreciated from reference to FIG. 1, the arms 32, 33 and 34 are secured adjacent the transverse spacer elements 16 and 17 where the strength of rail 15 is relatively rigid, as contrasted with the center cut away rail portions 39.

Stanchions 36 depend from the rails 14 and 15 and provide connection means for the transverse spacers 16 and 17 which are welded thereto in a drop center arrangement of tank support. A pair of spaced apart hinge plates 37 project from the depending stanchions 36 in the direction of the tow bar 21 and provide journal connections for the pivot 38. This arrangement lowers the tank 12 intermediate the siderails 14 and 15 as seen in FIG. 2. In some instances support bars 68 are secured in diagonal crossed relation as between the stanchions 36 and where used are welded or otherwise terminally secured to the bottom of stanchions 36. This does not restrict the torsional flexure of the chassis.

The spacer element 17 supports a cradle element plate 20 and provides a pedestal support for the tank bracket foot 40. This construction is best understood by reference to FIGS. 4 and 5 where the cradle 20 rests on the channel support 41 secured to the spacer element 17 by the bolt 42. The small platform 43 projects to actually provide support for the foot 40. As will be appreciated, the foot 40 is welded to the tank 12 and provides a bolt support pad for the connection of the tank 12 to the tank wagon 11. The fastening bolts 44 are indicated and the platform 43 is slotted to accommodate dimensional variances in bolt hole location. In FIG. 3, the tow bar 21 is shown in lowered position preparatory to connection for road towing. In phantom line the tow bar 21 is shown pivoted upwardly on the tow bar pivot 38 and latched by chain 45 in carrying field position.

In FIG. 3 the clevis frames 27 of the caster wheels 22 and 23 are seen to locate the horizontal axes 28 of the wheels 24 off center from the projection of the vertical axes of the journal cases 25. Hence, if the tank wagon 11 is towed in the direction of the casters 22 then the casters 22 and 23 will assume the trailing position as illustrated. If, however, the tow bar 21 is used and the tank wagon 11 is towed in the direction of casters 23, then the clevis elements 27 will change position 180 degrees on the vertical axes, the horizontal axes trailing the vertical axes.

The rails 14 and 15 are box structural shapes as best seen in the FIG. 1 and the portions 39 which are cut away between the depending stanchions 36 leave a channel shape as seen. Where it is economically feasible the rails 14 and 15 are formed from paired channels in flange to flange relationship and welded to form the box frame. Hence, between stanchions 36 the entire chassis 13 can flex torsionally on the channel section in a manner ideal to absorption of shock loading as the tank wagon 11 is towed in the field over humps and hollows and usually in off-set canted disposition on the caster wheels flanking the implement served by the tank.

By reference to FIG. 6 the use relationship of the tank wagon 11 is best appreciated shown attached to a gang plow frame 46 by means of the telescoping arms 32, 33 and 34.

The draw bar 47 of a tractor (not shown) is shown in connected pulling relation to the gang plow frame 46 at the pintle 48. The plows 49 (represented by the visible moldboards) move on the frame 46 as pulled by the tractor. The tank wagon 11 is then moved in parallel spaced apart relation to the plows 49 and tractor since the caster wheels 22 and 23 are generally in following parallel relation as shown although the main axis of the tank 12 and chassis 13 may be canted or askew to the line of travel or work. The angle or position of the tank wagon 11 is selected so that the towing thrust of the plow frame 46 is counteracted by the towing thrust of the tank wagon 11, thereby stabilizing the plow performance and making the job of soil injection relatively simple.

As will be appreciated, valved conduit means extend from the tank 12 to the tillage implement and quick disconnect couplings (not shown) provide easy means for disconnect. These details are not shown but provide the means for communicating inoculants, fertilizer, or conditioners to the soil injectant means usually associated with the tillage apparatus. The adjustment of the arms 32, 33 and 34 is easily accomplished using the slip locks 50. Release of the locks 50 permit the telescoping of one tubular element into the other as can best be appreciated by reference to FIGS. 7 and 8. In FIGS. 9 and 10 the terminal end brackets 51 as secured to the implement or plow frame 46 are seen. The end brackets 51 are adjustable to be secured to various size implement frame elements 52.

In each arm 32, 33 and 34, there is a large diameter tube 53 and a smaller diameter tube 54, the latter in a loose fit relationship to the former. A stop ring 55 is provided on the end of the small diameter tube 54. The stop ring 55 is in a close running fit on the I.D. of the larger tube. A block ring 56 is secured to the end of the large diameter tube 53 which flares internally and externally, the external flange of the block ring 56 provides a lock shoulder and the internal flange provides a buttress preventing full withdrawal of the small tube. Then, a spacer collar 57 is slidably over the tube 54 and abuts the blocking ring 56. A tube clamp 58, in split ring relation on the tube 54 includes a clamp pivot 59 and a clamp bolt 60. Pivotal on the pivot 59 is a clamp lock handle 61 which is bale-like and includes the latch block 62 which, upon closing, impinges on the flanges of the block ring 56 as shown. In use, connections are made at the brackets 29 by dropping the pivot pin 35 into place at the tank wagon end. Then the clamp 58 is loosened on tube 54 so that by raising the handle 61 the tube 54 can be located as to desired length and then release of the handle over the block ring 56 and tightening of the clamp 58 by means of bolt 60 fixed the adjustment and the handle 61 is biased to closed position by the tension spring 63. The clevis-like implement end of the tube 54 is then pivotally secured to the end brackets 51 as seen in FIGS. 9 and 10. The vertical pivot pin 64 is pressed through the opening bracket tongue 65 and the opening is transversely through the clevis end of the tube 54. The bracket tongue 65 is on horizontal pivot 66 in the bracket 51 and the bracket 51 is secured as by the bolts 67 in clamped selected relation on the implement frame element 52. Thus, as will be appreciated, the brackets 51 are selectively locatable on the implement frame 52 and the length of arms 32, 33 and 34 are adjusted to span the universal pivotal connection of the arms at both ends, at the brackets 29 and at the bracket 51. Since the terminal connections are pivotal both horizontally and vertically, the arms 32, 33 and 34 articulate universally at their ends and may be quickly released at the slip locks 50 or at the brackets 29 so that the tank wagon may be towed off for refill.

FIGS. 11-16 inclusive show variants in the tank wagon 11 for accommodation of smaller tanks and both two and one wheel versions are illustrated. In FIGS. 11, 12 and 13 the single caster unit 70 with dual wheels 71 and 72 is shown on a vertical pivot 73. The wheel support frame 74 depends slantingly beneath the pivot 73 and supports the cross axle 75. The axle 75 provides horizontal support for the wheels 71 and 72 trailing the vertical pivot 73. The caster wheel unit 70 is supported on the transverse caster support element 76 spanning beneath and in support of the two chassis rails 77 and 78. Transverse tank cradle elements 79 and 80 provide cradling support for the tank 81 and render the box rails 77 and 78 relatively rigid as between the cradle elements 79 and 80. This permits the same flexure of a torsional nature to be present for absorption of shock by the frame or chassis 82 transmitted thereto by the pneumatic wheels 71 and 72 and absorbed by the chassis 82 in avoidance of damage to the high mass tank 81 and contents. A latch mechanism 83 provides a simple spring loaded connection to the draw bar 84 which is secured to and projects from the plow carriage 85 as best seen in FIG. 12. The latch 83 is provided on the rail extension ends 86 and 87. A vertical slot 88 is biased closed by the generally U shaped latch plate 89 which is acted upon by the tension spring 90. The sliding movement of the plate 89 is guided by the guide pin 91 moving in the horizontal guide slot 92. The horizontal draw rod 93 can be selectively located in any pair of registering openings 94 in the rod support plates 95 which extend from the draw bar 84. The latch 83 is then opened by overcoming the spring bias and the latch plate 89 opens the slot 88 so that the rail extension ends 86 are then connected to the draw bar 84.

Release of the latch plate 89 prevents removal except on opening of the latch. The elevation of the latch 83 can be varied by location of the rod 93 in any registering pair of openings 94 in the support plates 95. This construction is best understood by interrelation of the FIGS. 11, 12 and 14. In FIG. 15 the draw bar 84 is connected to the plow frame 85 by the clamp 96. In FIG. 12 a plurality of the clamps 96 are used comprising upper and lower rectangular clamp plates 97 and tension bolts 98 at the corners thereof. Thus the two wheeled tank wagon 99 rolls on caster wheels outboard from the plow frame 85 and the chassis 82, formed of box rails 77 and 78 and transverse supports 76, 79 and 80, torsionally flexes in use. The draw bar 84 is selectively extendable and the tank wagon unit 99, when empty, can be fast carried to refill by disconnect at the latch lock 83.

FIG. 16 illustrates the single caster wheeled version in the form of tank wagon 100 which is similar to the structure described in FIGS. 11–15 except that it accommodates lighter tankage 101. The chassis 82, draw bar 84 and latch lock 83 are the same except as to size and weight and the wheel 102 is supported on the caster frame 102a which is preferably bifurcated in support of horizontal axle 102b and with vertical support on the stub shaft 102c. The tank 101 is supported on the cradle supports 79 and 80 and the tank can be welded or removably affixed thereto as desired by the field conditions.

Figure 17:
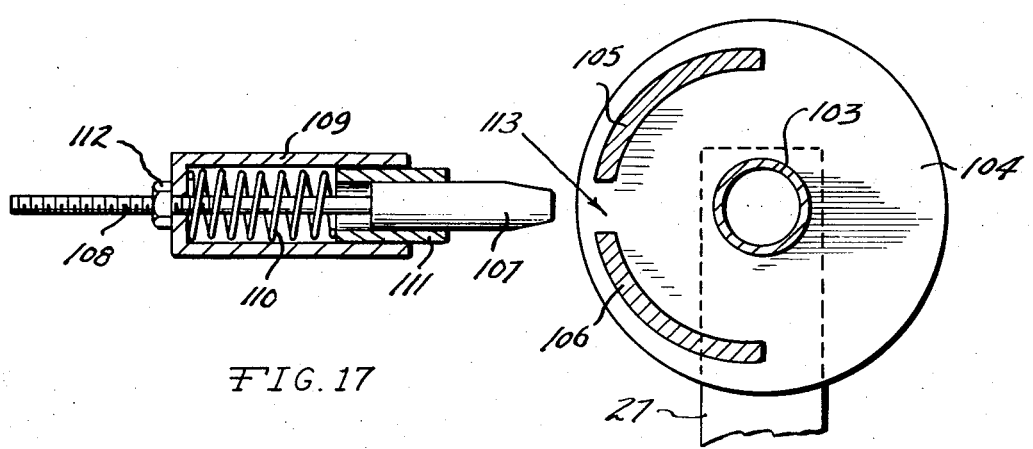
FIG. 17 is a sectional plan view taken on the line XVII—XVII of FIG. 3 and showing the swivel lock useful when the tank wagon is in road running condition.

FIGS. 17 and 18 show a lock stop (FIG. 17) and a brake structure applicable to the caster wheels to modify the caster movement of the wheel on the vertical spindle in tank wagon applications. While particularly useful in the heavy duty tank wagons 11 they are adaptable to the duals of tank wagon 99 or the single wheel of tank wagon 100. In field usage it is desirable to permit the casters to rotate as they wish on the vertical journalling. However, for road haulage or fast transport the caster action requires suppression or elimination so that the tank wagon 11 is stable when not connected to an implement by outrigger means. In FIG. 17 the caster wheel frame 27 is secured to the vertical spindle 103 and a horizontal disc plate 104 is secured as by welding to frame 27 and spindle 103. Hence, the disc 104 is movable with the spindle 103. A pair of gapped segment posts 105 and 106 are provided around the periphery of the disc 104 as seen. Radially disposed with respect to the spindle 103 is a plunger element 107 on the end of a threaded stem 108 and the plunger 107 is movable toward and away from the spindle 103. The case 109 is secured to the chassis of the tank wagon 11, as for example, under the rail 15 as seen in FIG. 3. A compression spring 110 in the case 109 bears against the base of bushing 111 and a nut 112 adjustably moves the plunger 107 and bushing 111 into the gap 113 thereby blocking rotation of the caster frame 27 in a preselected position since the tip of the plunger 107 seeks the gap 113 bearing against the segment posts 105 or 106 until dropping into the gap 113. This rigidly holds the caster wheels 22 or 23 as desired in rapid transport attitude. When the structure returns to the field, then the plunger element 107 is released by means of the nut 112 withdrawing the plunger 107 against the bias of spring 110.

FIG. 18 illustrates a braking structure 114 as applied on the caster wheels 24 and frame 27 which includes a vertical spindle 103 secured as by welding to disc 104. The disc 104 is provided with a cylindrical shoulder 115 which is really a brake drum. Partially peripherally around the shoulder or drum 115 is a brake shoe or band 116. Intermediate drum 115 and bank 116 is a brake surface or lining material 117. This may be secured to the drum 115 or the band 116 as facing. An actuating rod 117 extends radially from the band 116 and is attached thereto. The rod 117 is threadably on a bushing 118 which is reciprocal in the case 119 and the case 119 provides journalling support for the bushing 118. A compression spring 120 acts between case 119 and rod 117 as selectively urged by the nut 121 on the end of the rod 117 and selectively locating the thrust washer 122 against the compression spring. This provides a resilient adjustable brake bias suppressing the rotation of the caster frame 27. The case 119 is secured to the rail 15 for example, and may be relaxed or tightened as desired. In general, relaxation is the field condition and braking is desired for road usage.

OPERATION

In operation the tank wagon of the present invention is towed from the filling source to the field at high speed. In the field it is easily coupled to adjacent earth opening implements in a selected running attitude or relation whereby the casters allow parallel movement in respect to the implement served. This is accomplished by use of the telescopically adjustable arm elements extending from one side of the chassis. The unit tracks well over rough terrain and the chassis absorbs shock torsionally and flexes as needed to avoid field strain. The coupling and uncoupling is rapidly accomplished and the disconnect and towing to a refill station is speedy and smooth and the recoupling is vastly simplified by virtue of the continuing set relation for the telescoping coupling arms. The wheel latches are easily set as desired. The tank wagons of the present invention are simple, durable and easily maintained.

Having thus described my invention others skilled in the art may improve or modify the devices and such improvements or modifications are intended to be included herein limited only to the scope of the hereinafter appended claims.

I claim:

1. An improved tank wagon for liquid and gaseous soil injectants, fumigants and fertilizers comprising:
    a plurality of caster wheels;
    a chassis frame having at least a pair of elongate spaced apart longitudinal elements each having substantially reduced cross sections midway of their stronger support portions and providing resilient portions having torsional resistance to shock loading;
    an elongate cylindrical tank;
    tank fastening means secured to said chassis at said support portions thereof and suspending said tank out of direct contact with said reduced cross section portions of said chassis; and
    journal means secured to said chassis at said stronger portions of said chassis and in support of said caster wheels.

2. In a combination as set forth in claim 1 wherein said chassis is connected at the side with three adjustable towing arms, each of said arms including terminal universal end connections.

3. In a combination as set forth in claim 1 and including a selectively operable latch for fixedly positioning said wheels.

4. A combination tank wagon as set forth in claim 1 wherein a tow bar extends from one end of said chassis whereby said chassis may be towed behind a vehicle, as for example, on roads.

5. In a tank wagon combination the improvement comprising:
   a resilient chassis;
   an elongate cylindrical tank supported on said chassis;
   a pair of chassis side members selectively weakened midway of their ends to flex under torsional loading and providing resilient torsional support and in support of said tank adjacent the ends thereof;
   a plurality of caster wheels depending from said chassis;
   journals in said chassis and in journalling support of said caster wheels;
   side extending adjustable tow arms having universal connections at the ends thereof extending from the side of said chassis;
   selectively operable stop means suppressing rotation of said caster wheels in said journals; and
   a tow bar extending from one end of said chassis whereby said chassis may be towed behind a vehicle, as for example, on roads.

* * * * *